United States Patent
Patel

[15] 3,639,775
[45] Feb. 1, 1972

[54] ACOUSTICALLY CONTROLLED OPTICAL DEVICES

[72] Inventor: Chandra Kumar Naranbhai Patel, Summit, N.J.

[73] Assignee: Bell Telephone Laboratories, Inc., Murray Hill, N.J.

[22] Filed: Aug. 3, 1970

[21] Appl. No.: 60,583

[52] U.S. Cl. ..........................307/88.3, 321/69 R, 350/161
[51] Int. Cl. ...................................................H03f 7/00
[58] Field of Search...................307/88.3; 331/107; 321/69

*Primary Examiner*—John Kominski
*Assistant Examiner*—Darwin R. Hostetter
*Attorney*—R. J. Guenther and Arthur J. Torsiglieri

[57] ABSTRACT

The acoustically controlled optical devices disclosed employ an optically transparent piezoelectric medium, such as a β-quartz. The devices disclosed include an optical beam deflector in which the deflected beam is the second harmonic of two like-frequency input beams, which are phase-matched for generation of the second-harmonic beam propagating in the desired direction by an acoustic wave generated by an array of acoustic transducers. A second device is an optical frequency shifter employing light scattering from the mixed excitations called polaritons. The acoustic wave controls the frequency of the polaritons that do the light scattering.

4 Claims, 2 Drawing Figures

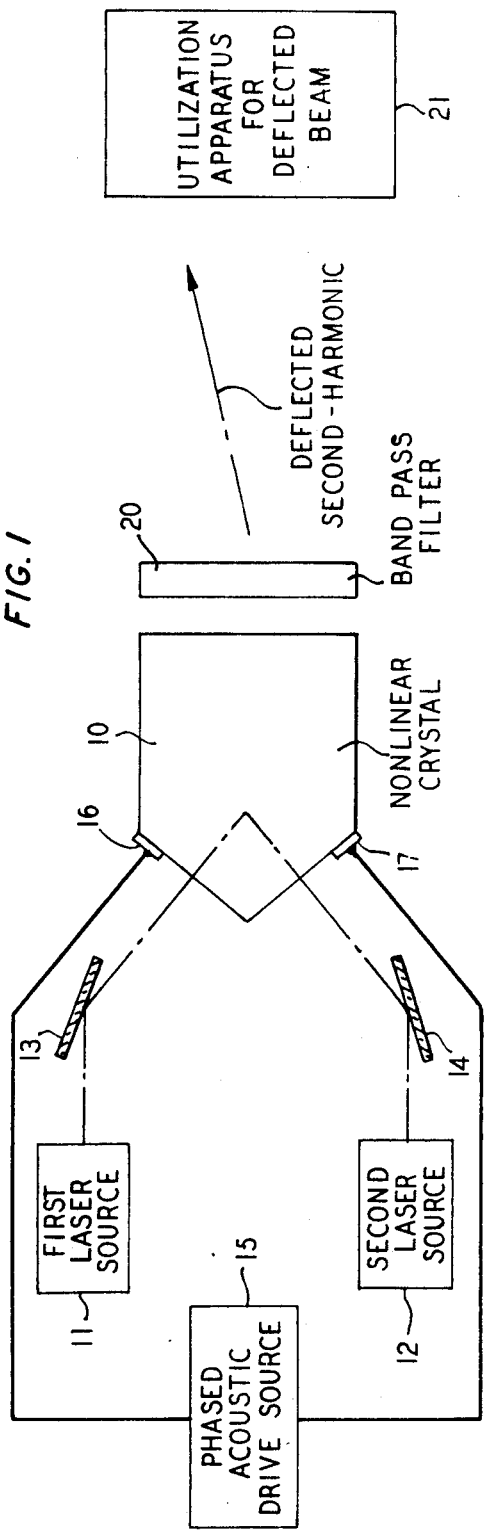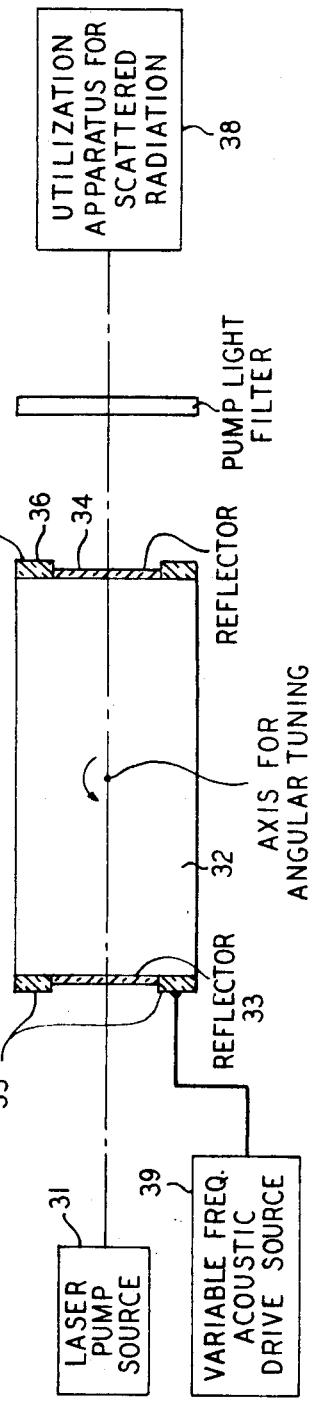

ACOUSTICALLY CONTROLLED OPTICAL DEVICES

BACKGROUND OF THE INVENTION

This invention relates to optical devices, such as optical beam deflectors and frequency shifters, in which an acoustic wave controls the interaction of one or more optical waves with a transparent crystal.

In the optical device art, the attempt to advance known techniques to a level of practicality has led to intensive investigations of relatively rare materials. Since most of these materials are not commercially available, the qualities of the crystals employed are typically unpredictable; and the optical losses are usually substantial. In fact, many supposedly new effects observed can be attributed, at least in part, to the presence of unknown or uncontrolled impurities.

Consequently, I have recognized the desirability of developing techniques for employing well-known, high quality optical materials that are widely commercially available. One such material is $\beta$-quartz. $\beta$-quartz is a highly transparent piezoelectric crystal having exceptionally low optical losses. While its nonlinear optical properties are usually considered to be undesirably small, it should not be concluded that no practical techniques can be developed for employing the $\beta$-quartz in a wide variety of optical devices, such as optical beam deflectors and frequency shifters.

SUMMARY OF THE INVENTION

According to my invention, optical devices employ an optically transparent piezoelectric medium in which the interaction of one or more optical beams with the medium, or the mutual interaction of a plurality of such beams, is controlled by an acoustic wave.

In an optical beam deflector according to my invention, the deflected beam is the second harmonic of two like-frequency input beams, which are phase-matched for generation of the second-harmonic beam propagating in the desired direction by an acoustic wave generated by an array of acoustic transducers. The angle of deflection of the second-harmonic beam is changeable by changing the relative phases of excitation of the transducers.

In an optical-frequency shifter according to my invention, light scattering from the mixed excitations called polaritons is tuned by an acoustic wave applied to the transparent medium to control the frequency of the polaritons that do the scattering.

Advantageously, both embodiments of my invention can employ $\beta$-quartz, but are not restricted thereto.

BRIEF DESCRIPTION OF THE DRAWING

Other features and advantages of my invention will become apparent from the following detailed description, taken together with the drawing, in which:

FIG. 1 is a partially pictorial and partially block diagrammatic illustration of an optical beam deflector according to my invention; and FIG. 2 is a partially pictorial and partially block diagrammatic illustration of an optical-frequency shifter according to my invention.

DESCRIPTION OF ILLUSTRATIVE EMBODIMENT

In the embodiment of FIG. 1, it is desired to generate a deflectable beam from two input light beams, the first of which is transmitted from source 11 and reflected by reflector 13 into the optically transparent $\beta$-quartz crystal 10 through surface 18. The second beam is transmitted from a second source 12 and reflected by reflector 14 into crystal 10 through surface 19 to intersect the beam from source 11. The interaction of the two optical beams is controlled by an acoustic wave in crystal 10 generated by the conventional acoustic transducers 16 and 17 attached to surfaces 18 and 19, respectively, and energized with variable, selected relative phases from the acoustic drive source 15. The light emanating from crystal 10 as a result of the interaction therein is filtered by a filter 20 which blocks optical frequencies of the frequency of sources 11 and 12 and passes a band of frequencies centered around the second harmonic of the frequency of those sources. The second-harmonic beam which is passed by filter 20 is intercepted by a suitable utilization apparatus 21, which may be a display screen or a series of discrete photoresponsive devices which are to be selected for operation by the deflected beam.

In operation, the nonlinear interaction in crystal 10 is an interaction of four different waves. If $\omega_1$ is the frequency of sources 11 and 12, then the interaction includes two waves of frequency $\omega_1$, one wave which is the resultant of the action of the electrically driven acoustic transducer 16 and 17 and has the acoustic frequency $\omega_a$, and a fourth wave which is an optical wave of frequency $\omega_2 = 2\omega_1$. The latter wave is the result of second-harmonic generation in crystal 10 because it has a second order nonlinear coefficient in its response to input electromagnetic waves.

It is one characteristic of the embodiment of FIG. 1 for generating acoustically phase-matched second-harmonic generation that the waves involved do not have to be linearly polarized, at least for the case of collinear propagation of beams 11 and 12 along the c-axis of $\beta$-quartz. For purposes of illustration, we shall assume that they are circularly polarized, the waves from the sources 11 and 12 being right-hand circularly polarized and the second-harmonic wave being left-hand circularly polarized. In that case the fourth wave, the acoustic wave, is a circularly polarized transverse acoustic wave which is launched by the appropriately phased excitation of the array of suitable conventional transducers 16 and 17.

Let us consider here, for example, a specific case in which $\omega_1$ is the frequency corresponding to the 6,943 A. unit wavelength of the ruby laser, the index of refraction of crystal 10 at $\omega_1$ is $n^\pm(\omega_1)=1.541$. For the second harmonic $\omega_2$, $n^\pm(\omega_2) = 1.566$. As a result of this difference in index, the amount of phase mismatching for collinear waves in the absence of the acoustic wave can be computed from the following equation:

$$\Delta k^\pm = (2k_1^\mp - k_2) \quad (1)$$
$$\Delta k^\pm = 2\omega_1/c[n(\omega_2)-n(\omega_1)] \quad (2)$$
$$= 4{,}520 \text{ cm.}^{-1} \text{ (wave numbers)}$$

Therefore, the circularly polarized transverse acoustic waves must have the phase propagation constant $k_a^\pm = 4{,}520$ cm$^{-1}$ for phase-matching in a collinear geometry. For this purpose, the acoustic frequency should be about 216 megahertz.

If, in the embodiment of FIG. 1, we take into account the angle $\theta$ between the two linearly polarized beams of frequency $\omega_1$, the required propagation constant $k_a$ is modified to be 5,915 cm.$^{-1}$; and its frequency $\nu_a$ should be 320 megahertz, for an angle $\theta$ equal to approximately 11.0° and for a second-harmonic beam propagating in a direction normal to the output surface of crystal 10. For values of $\theta$ between 0° and 11°, the values of $k_a$ and $\nu_a$ assume values between 4,520 cm.$^{-1}$ and 5,915 cm.$^{-1}$, and 216 MHz. and 320 MHz., respectively. It is emphasized here that when $\theta$ is not substantially zero, both input light beams and the acoustic beam should be linearly polarized.

By adjusting the phases of transducers 16 and 17, we can produce an acoustic beam in the crystal 10 which can be swept in any direction in the plane of the paper. It should be clear that by using a two-dimensional array of such transducers and three input laser beams, we can sweep the acoustic beam in two coordinates, as would be desired for a two-coordinate optical beam deflector. By adjusting the frequency of the acoustic wave simultaneously with its change in direction in crystal 10, we can maintain phase-matching for a second-harmonic beam of frequency $\omega_2$ propagating in a direction which has a 1:1 correspondence with the direction of the acoustic wave in crystal 10.

The fact that the output face of crystal 10 is normal to the direction of the undeflected beam will, in fact, amplify the angular deflection of the deflected second-harmonic beam by an amount which is roughly proportional to the refractive index of the crystal 10.

Briefly mentioned above was the possibility of deflecting the acoustic beam in two coordinates. In order to utilize this capability to produce two-coordinate optical beam deflection, we may use three optical beams admitted to the crystal 10 through three different angularly disposed faces and intersecting in a common region therein. In addition, the transducer array would include transducers on each of the three entrance faces of crystal 10 traversed by the optical beams. The elaboration of the embodiment of FIG. 1 to implement this alternative is straightforward and a direct extension of the principles outlined above. Such a beam deflector is an ideal solid state optical beam deflector because there are no moving parts and the deflection can be extremely fast.

The background light at the second-harmonic frequency $\omega_2$ can be made arbitrarily small by making a relatively long nonlinear crystal 10 such that the square of its length divided by the square of the coherence length is much greater than one. The coherence length is a well-known parameter in coherent optical devices. The foregoing relationship is easily obtained with $\alpha$-quartz and with other conventional nonlinear optical materials.

In the embodiment of FIG. 2, it is desired to obtain a tunable optical radiation from the fixed frequency optical radiation provided by the laser pump source 31. The tunable radiation is generated in a transparent piezoelectric crystal 32 such as $\alpha$-quartz in response to the beam of radiation from source 31. The output radiation from the crystal 32 is then utilized in an apparatus 38, such as a heterodyne stage of an optical communication receiver. As is well known, a tunable local oscillator signal is highly useful for such applications.

To obtain coherent scattered light from the input coherent light, the crystal 32 is provided with reflectors 33 and 34 which are partially reflective and partially transmissive at both the pump and scattered light frequencies and are disposed on opposite surfaces of crystal 32 along the direction of propagation of the pump beam to form an optical resonator for the scattered radiation. Residual pump light is filtered from the output radiation by filter 37, which may be a selective absorber at the pump frequency $\omega_1$.

An annular acoustic transducer 35 is disposed around reflector 33 on the input surface of crystal 32 and is energized by the variable power acoustic drive source 39. To prevent spurious reflections of the acoustic wave from the output end of crystal 32, an annular termination 36 is disposed about reflector 34 to absorb most of the residual acoustic wave at that surface.

For tuning in addition to that provided by the acoustic wave, a spindle can be optionally attached to the side of crystal 32 with a suitable adhesive to provide the indicated axis for angular tuning of the scattered light frequency. The variation of the frequency of polariton scattering with variation in the angle of light propagation through a crystal is well known and will not be further described here.

In the operation of the embodiment of FIG. 2 to obtain acoustic wave tuning of the output scattered light, the following considerations are pertinent.

A polariton, the phenomenon responsible for the scattering in crystal 32, can be described as a mixed excitation having the properties both of a crystalline lattice vibration, called a phonon, and an electromagnetic wave. Polaritons are generally most effective in scattering incident light when the incident pump light, the polariton and the scattered light are propagating nearly collinearly. Under these conditions, there is usually only a single possible frequency which a polariton may have to be effective in scattering; and this frequency will be that frequency which will provide the condition commonly known as phase-matching. That is, $$\mathbf{k}_s = \mathbf{k}_L - \mathbf{q}, \quad (3)$$

where $\mathbf{k}_s$ is the vector phase propagation constant of the scattered light, $\mathbf{k}_L$ is the vector phase propagation constant of the pump light, and $\mathbf{q}$ is the vector phase propagation constant of the polariton. The foregoing condition must be satisfied simultaneously with the following relationship of the frequencies involved:

$$\omega_s = \omega_L - \omega, \quad (4)$$

where the $\omega$'s are all angular frequencies, the subscripts have the same significance as in equation (3) and $\omega$ without a subscript is the angular frequency of a polariton.

Under the condition of collinear propagation, no tunability normally exists in an insulating type crystal such as the $\alpha$-quartz crystal 32. This fact is a source of the lack of practicality in polariton scattering devices heretofore, inasmuch as it is the insulating crystals which have the lowest optical loss and have, in all other respects, the most predictable qualities. While some tunability may be obtained by the indicated angular tuning, this tunability is obtained at a substantial sacrifice of scattering length.

Accordingly, it is the acoustic wave generated by the annular transducer 35 which makes it possible to vary the phase-matching condition and frequency relationship simultaneously without departure from collinearity of all the waves. In general $$q = k_L - k_s \pm q_a, \quad (5)$$

where the $q_a$ is the equivalent phase propagation constant of the acoustic wave.

It should be noted that the value of $q_a$ in the foregoing relationship is dependent primarily upon the frequency of the acoustic wave. It should be further noted that while it is not essential that the acoustic wave always propagate exactly collinearly with the other waves, the simplest configurations will provide such collinear propagation, as in FIG. 2.

The effect of the acoustic wave may be analyzed as an effective change in index of crystal 32 for all three of the other waves; that is, the pump light, the scattered light, and the polariton. Thus, $q_a$ can be viewed to be a measure of the effectiveness of the acoustic wave in changing the relative indices of refraction of crystal 32 for the other waves.

By sweeping the frequency of the acoustic wave rapidly, it should be possible to "chirp" the frequency, $\omega_s$, of the tunable stimulated Raman scattering over a wide range. The "chirped" signal can be converted into an ultrashort pulse using conventional techniques.

I claim:

1. In combination, a piezoelectric crystal that is substantially transparent throughout a substantial frequency range around the optical frequency $\omega_1$, said crystal having the capability of transmitting scattered radiation at frequency $\omega_s$ in response to an interaction with radiation of the frequency $\omega_1$, where $\omega_1 - \omega_s = \omega$ is the frequency of a polariton in said crystal, a source of a beam of radiation at frequency $\omega_1$ directed toward said crystal for scattering interaction therein, means associated with said crystal for resonating scattered radiation and transmitting a portion thereof, and means for generating an acoustic wave in said crystal to select the value of $\omega_s$.

2. A combination according to claim 4 in which the means for generating an acoustic wave comprises an acoustic transducer on a first surface of the crystal essentially normal to the direction of the beam of radiation at frequency $\omega_1$, whereby the acoustic wave propagates essentially parallel to said direction and provides collinear phase-matching of said beam, said scattered radiation, said acoustic wave and said polariton.

3. A combination according to claim 5 in which the means for generating an acoustic wave comprises an annular acoustic transducer centered about the axis of propagation of the radiation of frequency $\omega_1$, an annular acoustic termination on a second surface of said crystal opposite and essentially parallel to the first surface, and a variable drive source coupled to said acoustic transducer to select the value of $\omega_s$ in inverse dependence upon the power of said drive source.

4. A combination according to claim 6 in which the crystal is $\alpha$-quartz.

* * * * *